(12) United States Patent
Shaver et al.

(10) Patent No.: US 10,301,051 B2
(45) Date of Patent: May 28, 2019

(54) BAIL HANDLE APPLICATOR

(71) Applicant: RING CONTAINER TECHNOLOGIES, LLC, Oakland, TN (US)

(72) Inventors: Rusty Shaver, Oakland, TN (US); Daniel Futral, Somerville, TN (US); Doug Dygert, Olive Branch, MS (US); Carl Ring, Memphis, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 530 days.

(21) Appl. No.: 15/016,463

(22) Filed: Feb. 5, 2016

(65) Prior Publication Data

US 2016/0152366 A1    Jun. 2, 2016

Related U.S. Application Data

(63) Continuation of application No. PCT/US2015/023300, filed on Mar. 30, 2015.

(Continued)

(51) Int. Cl.
| | |
|---|---|
| *B29C 65/58* | (2006.01) |
| *B65B 61/14* | (2006.01) |
| *B29C 65/00* | (2006.01) |
| *B29C 65/78* | (2006.01) |
| *B29L 31/00* | (2006.01) |

(52) U.S. Cl.
CPC .............. *B65B 61/14* (2013.01); *B29C 65/58* (2013.01); *B29C 65/7841* (2013.01);
(Continued)

(58) Field of Classification Search
CPC ...... B65B 61/14; B65D 23/108; B65D 25/32; Y10T 29/53326; Y10T 29/53657; B29C 65/58
(Continued)

(56) References Cited

U.S. PATENT DOCUMENTS

| | | | |
|---|---|---|---|
| 219,275 A | * | 9/1879 | Knapp ................... B21D 39/04 29/243.517 |
| 2,535,473 A | | 12/1950 | Wolford |

(Continued)

FOREIGN PATENT DOCUMENTS

| | | | |
|---|---|---|---|
| CN | 102554600 A | | 7/2012 |
| JP | 54034186 A | * | 3/1979 ............ B23P 19/084 |

(Continued)

OTHER PUBLICATIONS

CN 102554600 English translation, espacenet.com, retrieved May 25, 2018, 10 pages.*

(Continued)

*Primary Examiner* — Stephen F. Gerrity
(74) *Attorney, Agent, or Firm* — Sorell, Lenna & Schmidt, LLP (57) ABSTRACT

Provided is a method and apparatus for applying a bail handle to a container. The applicator includes a pickup mandrel for picking up the bail handle to be applied to a container; a stationary mandrel for receiving the bail handle from the pickup mandrel, the stationary mandrel having an engaging surface which has a diameter larger than an inner diameter of the bail handle when picked up by the pickup mandrel; and an applicator mandrel for receiving the bail handle from the pickup mandrel, the applicator mandrel having an engaging surface which has a diameter equal to or smaller than the stationary mandrel.

20 Claims, 12 Drawing Sheets

Related U.S. Application Data (60) Provisional application No. 61/972,644, filed on Mar. 31, 2014.

(52) U.S. Cl.
CPC ...... B29C 65/7847 (2013.01); B29C 66/5344 (2013.01); B29C 66/8322 (2013.01); *B29L 2031/7158* (2013.01)

(58) Field of Classification Search
USPC .......... 53/413, 134.1; 29/235, 774; 215/397; 220/758, 760, 769, 773; 493/88, 465, 493/466, 909
See application file for complete search history.

(56) References Cited

U.S. PATENT DOCUMENTS

| | | | |
|---|---|---|---|
| 3,036,371 A | 5/1962 | Gray et al. | |
| 3,407,564 A | 10/1968 | Randrup | |
| 3,858,297 A * | 1/1975 | Scholin et al. | B23P 19/084 29/229 |
| 4,177,546 A * | 12/1979 | Geisinger | B65B 61/14 29/235 |
| 4,236,305 A * | 12/1980 | Hetherington et al. | B23P 19/084 215/399 |
| 4,286,367 A | 9/1981 | Geisinger | |
| 4,562,684 A | 1/1986 | Dreher | |
| 5,392,505 A | 2/1995 | Harada | |
| 5,471,814 A * | 12/1995 | Ruckdschel | B65B 61/14 53/131.3 |
| 5,524,336 A * | 6/1996 | Gibas | B65B 17/025 29/774 |
| 5,768,767 A | 6/1998 | Burchell et al. | |
| 2004/0194277 A1 | 10/2004 | Hunter | |
| 2005/0205436 A1 * | 9/2005 | Erickson | B65D 23/108 206/139 |
| 2005/0236356 A1 * | 10/2005 | Lonsway | B65D 23/106 215/396 |
| 2006/0249477 A1 * | 11/2006 | Simpson, Jr. et al. | B65D 23/104 215/384 |
| 2012/0117794 A1 | 5/2012 | Tsai et al. | |
| 2012/0272501 A1 * | 11/2012 | Schafer et al. | H01R 43/005 29/428 |
| 2013/0239393 A1 * | 9/2013 | Ziegler | B65H 19/10 29/428 |

FOREIGN PATENT DOCUMENTS

| | | |
|---|---|---|
| WO | 2006/041454 A1 | 4/2006 |
| WO | 2006041454 | 4/2006 |
| WO | WO 2014124027 A1 * | 8/2014 ......... B25B 27/0028 |

OTHER PUBLICATIONS

EP 15773991.3—Extended European Search Report, completed Apr. 25, 2017, European Patent Office, Munich, DE dated May 17, 2017.
International Search Report of PCT/US2015/023300, dated Jul. 2, 2015. [PCT/ISA/210].
Written Opinion of PCT/US2015/023300, dated Jul. 2, 2015. [PCT/ISA/237].
International Preliminary Report on Patentability, mailed from The International Bureau of WIPO dated Oct. 4, 2016, in PCT/US2015/023300, Intl. filing date Mar. 30, 2015.

* cited by examiner

HANDLE STATE 1

FIG. 1

HANDLE STATE 2

FIG. 2

HANDLE STATE 3

FIG. 3

HANDLE STATE 4

FIG. 4

HANDLE STATE 5

BAIL HANDLE APPLICATOR

BACKGROUND OF THE INVENTION

1. Field of the Invention

The present invention relates to an apparatus and method for applying a bail handle to a lightweight container, which requires little to no container top load strength.

2. Background

What has existed before are ways to install a bail handle to a plastic bottle once it has been filled with product.

It became clear that this invention is needed in order to provide customers a light bottle with a handle so that the customer would not have to modify their fill line or maintain another piece of equipment. The present invention relates to installing a handle on an empty lightweight container that has very little top load capability.

The invention relates to applying a bail handle without putting any force on the top of the bottle. This solves the issue of the top of the bottle crushing when applying a handle in the usual fashion.

SUMMARY OF THE APPLICATION

According to one aspect of the application, an applicator for applying a bail handle to a container is provided. The applicator includes a pickup mandrel for picking up the bail handle to be applied to a container; a stationary mandrel for receiving the bail handle from the pickup mandrel, the stationary mandrel having an engaging surface which has a diameter larger than an inner diameter of the bail handle when picked up by the pickup mandrel; and an applicator mandrel for receiving the bail handle from the pickup mandrel, the applicator mandrel having an engaging surface which has a diameter equal to or smaller than the stationary mandrel.

According to another aspect, the applicator may include a lower pressing collar movably disposed on the stationary mandrel that is configured to move vertically upward and downward to push the bail handle off of the stationary mandrel; and an upper pressing collar movably disposed on the applicator mandrel and configured to move vertically upward and downward to push the bail handle off of the applicator mandrel.

According to another aspect, the applicator may include a pickup mandrel that further comprises openings for applying a vacuum to the bail handle and a pushing surface for supporting the bail handle on the vacuum is applied.

According to another aspect, the each of the pickup mandrel and the applicator mandrel have a frustoconical shape on a lower surface thereof, and the stationary mandrel has an inner surface that is tapered to mate with the frustonconial shapes of the pickup mandrel and the applicator mandrel.

According to another aspect, the bail handle comprises a circular mount portion and a handle portion extending from the mount portion, an radially inward side of the mount portion comprising a plurality of inclined tabs separated by gaps.

According to another aspect of the application, provided is a method for applying a bail handle having a mount portion configured to mount to a neck of a container to a container having a supporting bead formed on a neck thereof. The method includes picking up the bail handle using a pickup mandrel; positioning the pickup mandrel over a stationary mandrel and pushing the bail handle over an engaging surface of the stationary mandrel; moving the pickup mandrel away from the stationary mandrel; positioning an applicator mandrel over the stationary mandrel to engage the stationary mandrel and pushing the bail handle from the engaging surface of the stationary mandrel to an engaging surface of the applicator mandrel; and positioning the applicator mandrel over the container and pushing the bail handle over a support bead formed on a neck of the container.

According to another aspect, the bail handle is pushed over the engaging surface of the applicator mandrel using a collar movably disposed on the stationary mandrel, and the bail handle is pushed over the support bead of the container using a collar movably disposed on the applicator mandrel.

According to another aspect, the method includes applying a vacuum through openings in the pickup mandrel to pick up the bail handle; and pushing the bail handle using a pushing surface of the pickup mandrel to push the bail handle over the engaging surface of the applicator mandrel.

According to another aspect, the bail handle comprises a circular mount portion and a handle portion extending from the mount portion, an radially inward side of the mount portion comprising a plurality of inclined tabs separated by gaps.

BRIEF DESCRIPTION OF THE DRAWINGS

The above and other features and aspects of the present invention will become more apparent by describing in detail non-limiting, exemplary embodiments thereof with reference to the attached drawings in which.

DETAILED DESCRIPTION OF THE EMBODIMENTS

The container according to the present invention according to the non-limiting, exemplary embodiments of the present invention is described below with reference to the accompanying drawings.

Figure 1:
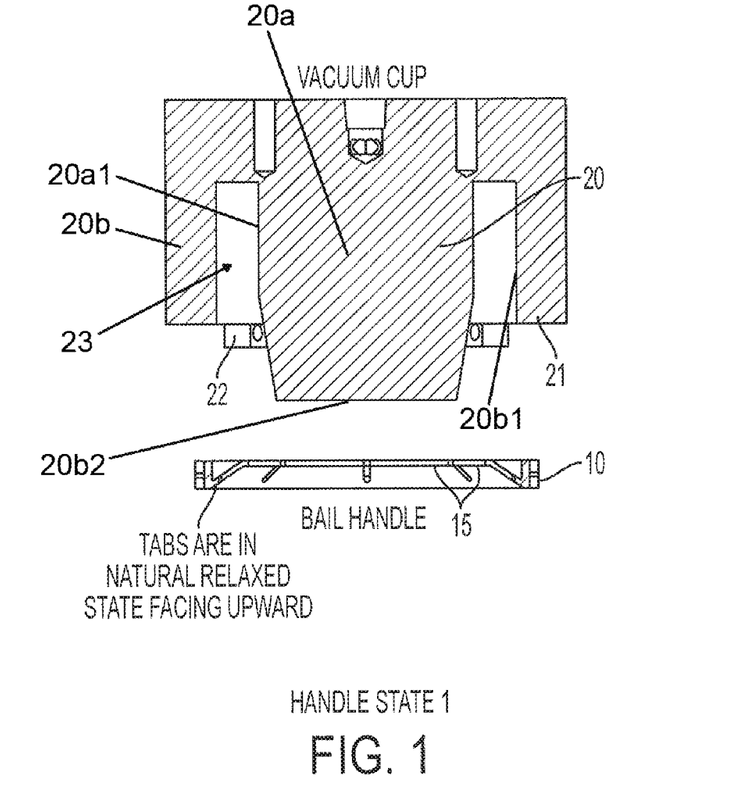
FIG. 1 shows a device for picking up a bail handle to be applied to a container.
Figure 2:
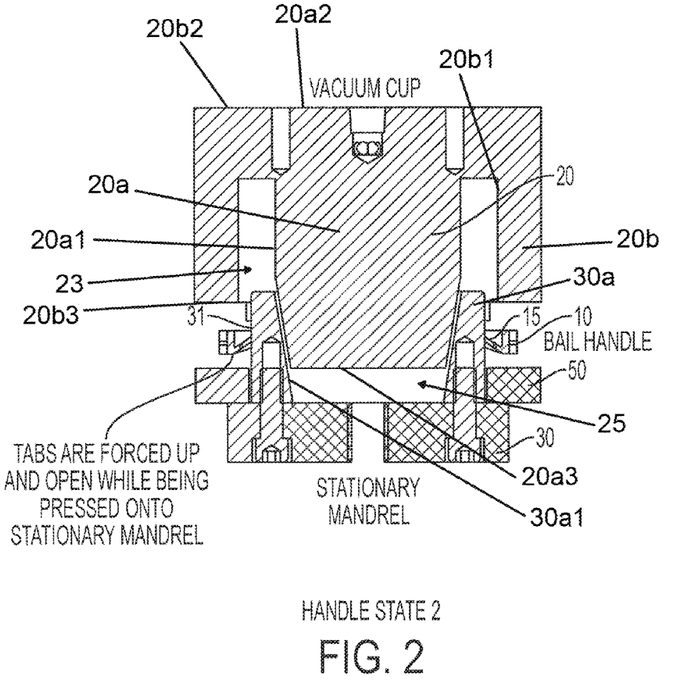
FIG. 2 shows a view of transferring the bail handle from the pickup device to a stationary mandrel.
Figure 6:
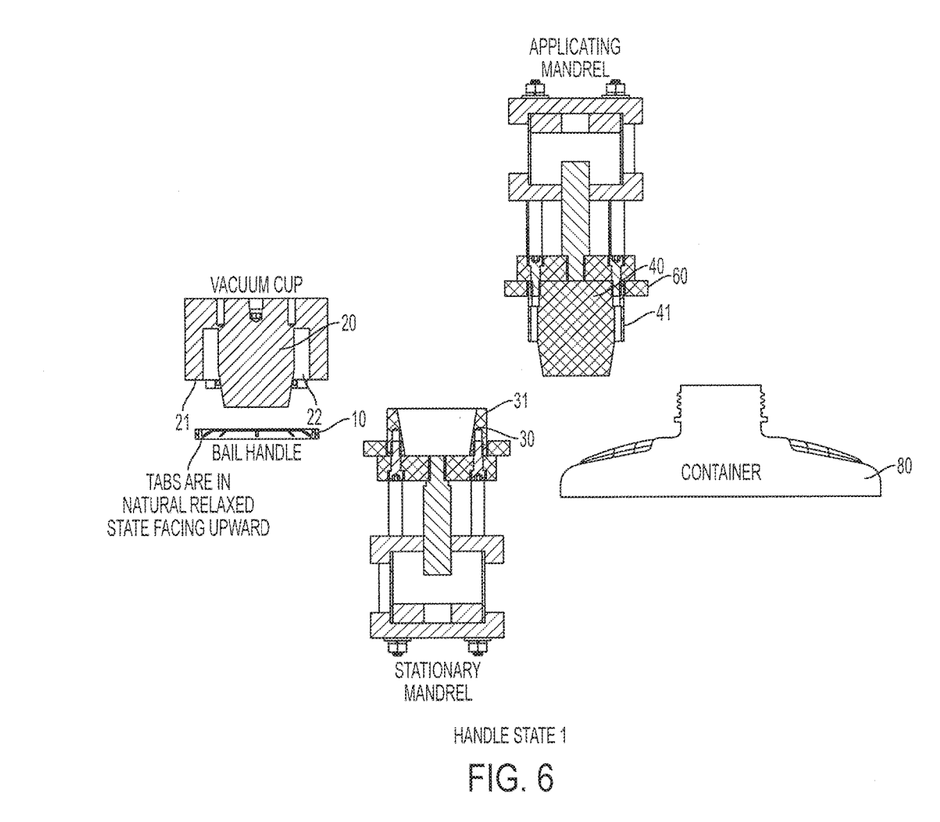
FIGS. 6 through 10 show the process of applying a mandrel to a container using the applicator parts according to an exemplary embodiment of the present application.
Figure 7:
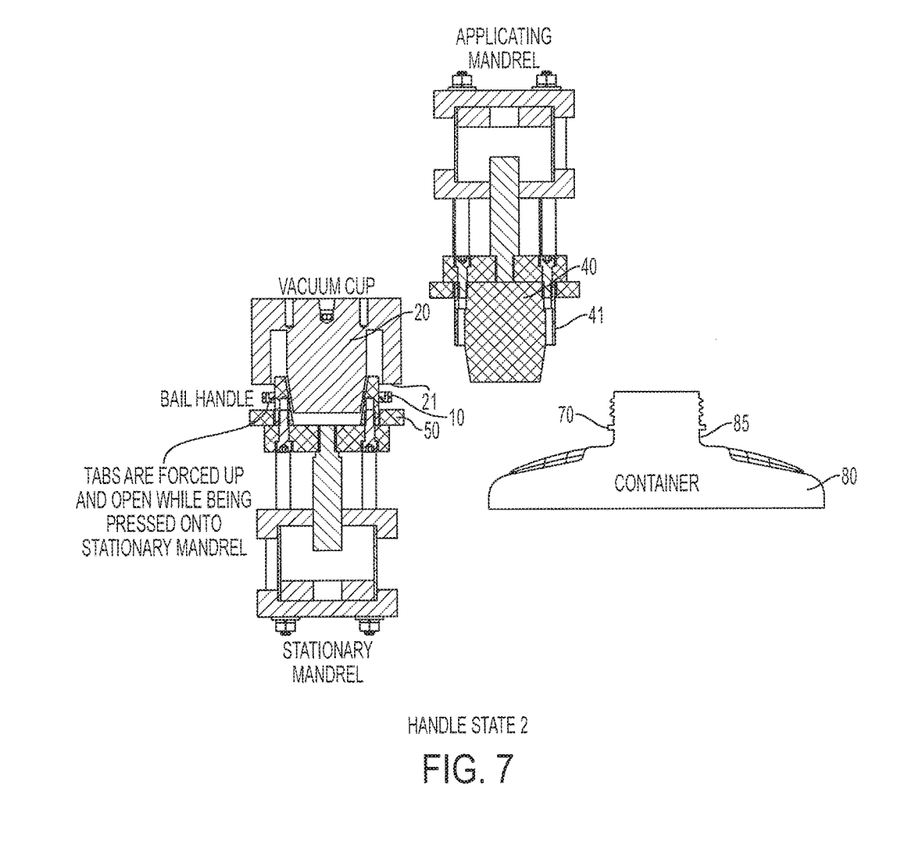
Figure 8:
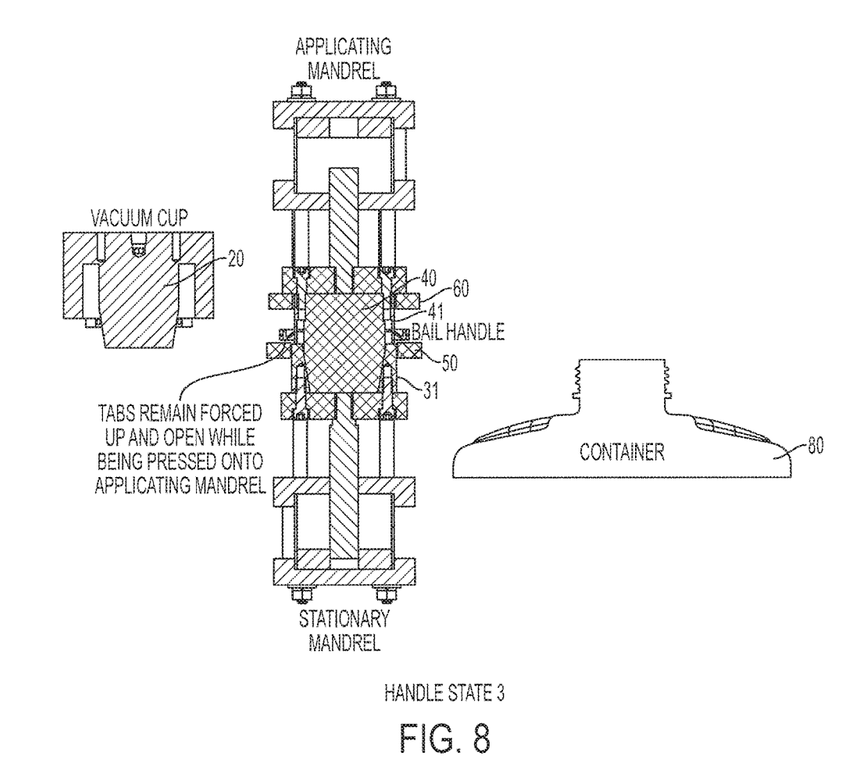

This embodiment describes the method and apparatus for installing a plastic bail handle onto a plastic bottle. The plastic bottle will be empty at the time of application. This embodiment works well with plastic bottles will be very light and unable to support a top load without crushing. The downward force required to install the handle is greater than the bottle can withstand. The process begins with the handle being picked up using a vacuum cup as shown in FIGS. 1 and 6. The vacuum cup will not only transport the handle but will also press the handle onto a round mandrel as shown in FIGS. 2 and 7. As the handle is pressed onto the mandrel, the locking tabs on the handle spread open and are facing up.

The vacuum cup then returns to get another handle. Another round (applicator) mandrel is then located on top of the first (stationary) mandrel on which the handle has been applied. The two mandrels (stationary and applicator) are designed to center on each other and the outer most diameters of each mandrel are the same. A pressing collar on the first (stationary) mandrel then presses the handle over and onto the second (applicator) mandrel. The locking tabs are still facing up so the handle is pressed in the direction that is against the locking tabs. Now the handle is on the second (applicator) mandrel with its locking tabs still spread open and facing up. The second (applicator) mandrel is now located over the neck of the bottle. The second (applicator) mandrel is also hollow on the inside so as to fit over the threads of the neck and its outside diameter is the same as or greater than the locking bead on the neck of the bottle. The second (applicator) mandrel is located over the neck and just touches the locking bead of the neck in a way that does not apply any downward force on the bottle. So at this point the threads of the neck are inside the second mandrel and the handle is on the outside of the second mandrel with its locking tabs facing up. A pressing collar on the second mandrel now pushes the handle off the mandrel and past the locking bead on the neck. The handle is now installed on the container.

The apparatus and method for applying a bail handle to a container is described in detail below with reference to FIGS. 1-12B. The bail handle 10 includes a mount portion 9 and a handle portion 8. The mount portion 9 includes a plurality of flexible inclined tabs 15. The inclined tabs 15 are configured to have enough flexure such that when inclined further upward the inner diameter of the mount portion 9 is equal to or greater than outer diameter the support bead 70 of the container 80. These inclined tabs 15 have resilience such that after being pressed over the support bead 70, they return to their original positions such that the inner diameter of the mount portion 9 defined by the tabs 15 is less than the outer diameter of the support bead 70. In some embodiments, mount portion 9 is circular. In some embodiments, a radially inward side 9a of mount portion 9 includes inclined tabs 15. In some embodiments, inclined tabs 15 are spaced apart from one another by gaps 16.

Figure 3:
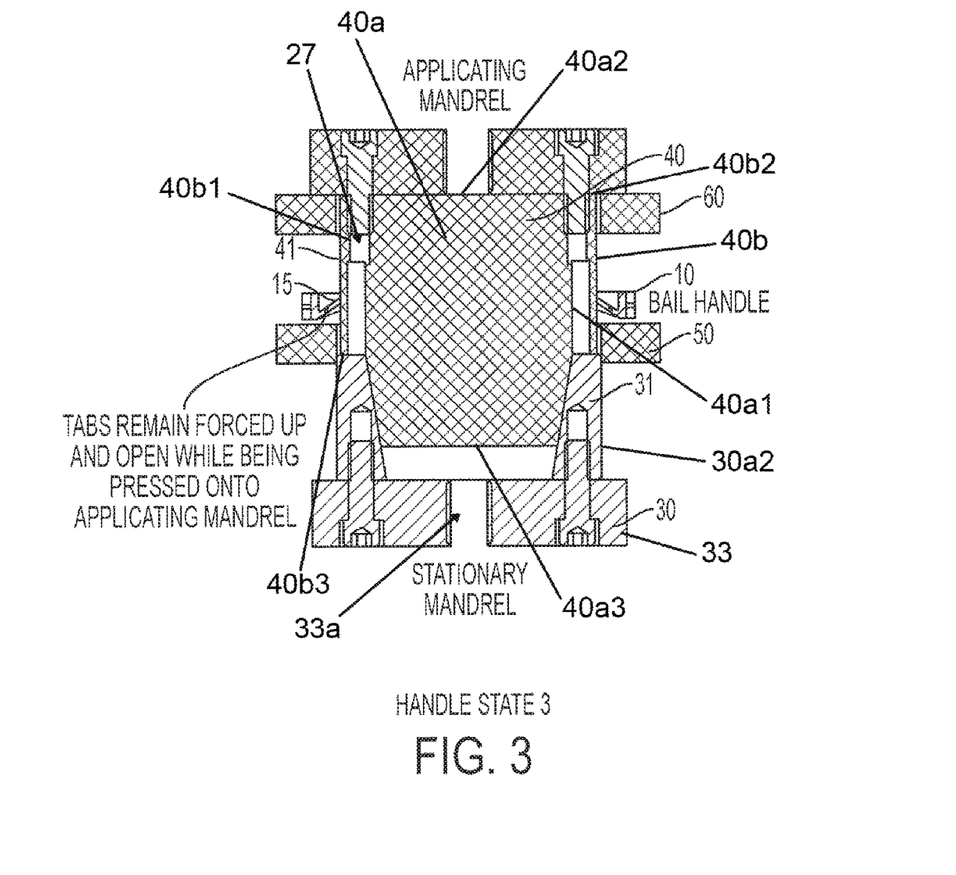
FIG. 3 shows the process of transferring the bail handle from the stationary mandrel to an applicator mandrel.
Figure 12A:
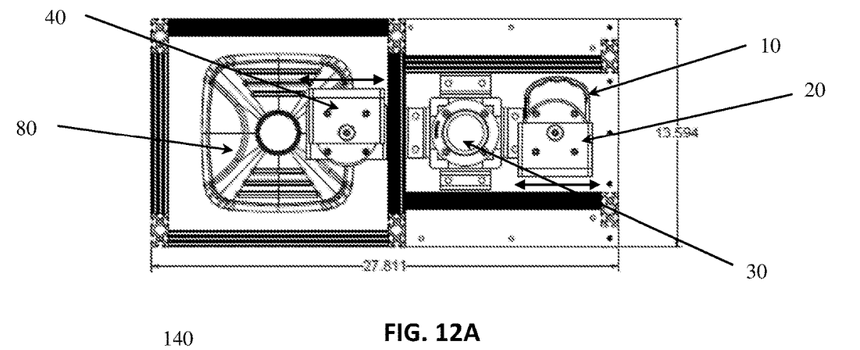
FIGS. 12A and 12B show an apparatus for applying a bail handle to a container.
Figure 12B:
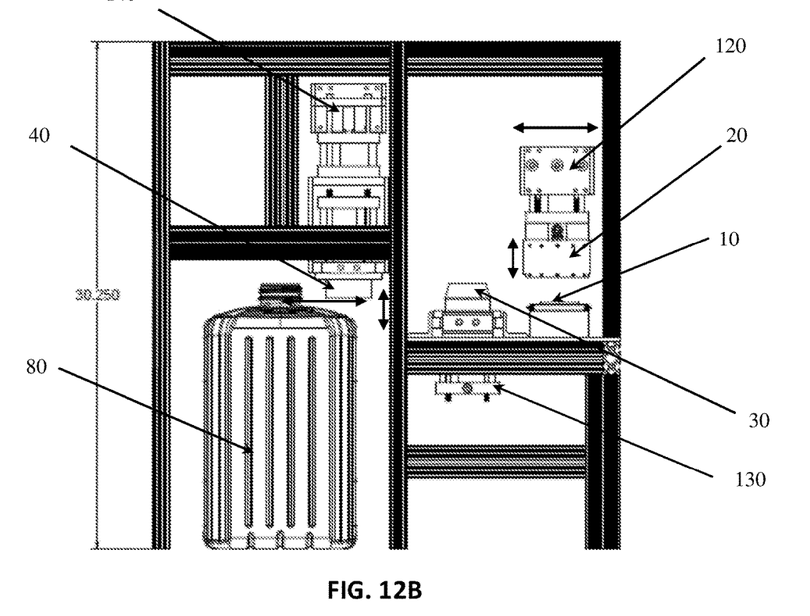

As illustrated in FIGS. 12A and 12B, the apparatus for applying a bail handle 10 to a container 80 includes a bail handle initial supply point 11, a vacuum cup mount 120, a stationary mandrel mount 130 and an applicator mandrel mount 140. The vacuum cup applicator 20 is movably attached to the vacuum cup mount 120 so as to move in a vertical direction in order to engage the bail handle 10 at the bail handle initial supply point 11. The vacuum cup 20 is also configured to move horizontally 40 to position vacuum cup applicator 20 above the stationary mandrel 30. Additionally, the applicator mandrel 40 is movably attached to the applicator mandrel mount 140 to move vertically and upward and downward direction. The applicator mandrel mount 140 is also configured to move horizontally so that the applicator mandrel 40 can be positioned above the stationary mandrel 30 and the container 80. In some embodiments, vacuum cup 20 includes a first projection 20a and a first wall 20b surrounding projection 20a, as shown in FIG. 1. An inner surface 20b1 of wall 20b and an outer surface 20a1 of projection 20a define a first cavity 23. In some embodiments, stationary mandrel 30 includes a second wall 30a configured for disposal in cavity 23, as shown in FIG. 2. An inner surface 30a1 of wall 30a defines a second cavity 25 configured for disposal of projection 20a. In some embodiments, applicator mandrel 40 includes a second projection 40a and a third wall 40b surrounding projection 40a, as shown in FIG. 3. In some embodiments, projection 20a and projection 40a each have a frustoconical shape, as shown in FIGS. 1-10, for example. In some embodiments, inner surface 30a1 is tapered to mate with the frustoconical shapes of projection 20a and projection 40a, as shown in FIGS. 2 and 3, for example. In some embodiments, an outer surface 40a1 of projection 40a and an inner surface 40b1 of wall 40b define a third cavity 27 configured for disposal of a neck 85 of container 80. In some embodiments, projection 40a is configured for disposal in an opening 85a of neck 85. In some embodiments, first projection 20a includes a first end surface 20a2 and an opposite second end surface 20a3 and a first wall 20b includes a first end surface 20b2 and an opposite second end surface 20b3. In some embodiments, end surface 20a2 is flush with end surface 20b2 and end surface 20a3 extends beyond end surface 20b3. In some embodiments, inner surface 30a1 extends transverse to a longitudinal axis defined by mandrel 30 and an opposite outer surface 30a2 of wall 30a extends parallel to the longitudinal axis defined by mandrel 30. In some embodiments, projection 40a includes a first end surface 40a2 and an opposite second end surface 40a3 and a third wall 40b includes a first end surface 40b2 and an opposite second end surface 40b3. In some embodiments, end surface 40a2 is flush with end surface 40b2 and end surface 40a3 extends beyond end surface 40b3. In some embodiments, mandrel 30 includes a transverse wall 33 and an opening 33 that extends through a thickness of wall 33.

The process for mounting the bail handle 10 to the container 80 is described below. With reference to FIGS. 1 and 6, the vacuum cup applicator 20 is configured to be supplied with a vacuum to pick up and hold the bail handle 10. The vacuum cup applicator 20 comprises openings 22 for applying a vacuum to the bail handle 10, and a pushing surface 21 for supporting the bail handle 10. After the vacuum is applied to the vacuum cup applicator 20 and the bail handle 10 is engaged against the pushing surface 21, the vacuum cup applicator 20 is moved vertically upward and then horizontally to be positioned above the stationary mandrel 30. The vacuum cup applicator 20 is then is lowered to push the bail handle 10 over the engaging surface 31 of the stationary mandrel 30 using the pushing surface 21 as shown in FIGS. 2 and 7. This causes the inclined tabs 15 of the bail handle 10 to be forced upward so that the gaps 16 open in the inner diameter of the mount portion 9 is the same as the outer diameter of engaging surface 31. The vacuum on the vacuum cup applicator 20 is released and the vacuum cup applicator 20 is moved vertically upward and then horizontally to be positioned above the bail handle initial position 11 to engage another bail handle 10. In some embodiments, engaging surface 31 defines an outer surface of wall 30a. In some embodiments, the diameter of engaging surface 31 is larger than the inner diameter of bail handle 10 when picked up by vacuum cup 20. In some embodiments, openings 22 are configured for applying a vacuum in cavity 23 and an end surface of wall 20b2 defines a pushing surface for supporting bail handle 10.

Next, the operation for transferring the bail handle 10 from the stationary mandrel 30 to the applicator mandrel 40 is described with reference to FIGS. 12A, 12B and 3. At this point the applicator mandrel mount 140 moves horizontally to be positioned over the stationary mandrel 30. Then, the applicator mandrel 40 is moved vertically downward to engage the stationary mandrel 30. The stationary mandrel 30 is fitted with a lower pressing collar 50 that is configured to move up and down in a vertical direction. To move the bail handle 10 from the stationary mantle 32 the applicator mandrel 40, the lower pressing collar 50 is moved upward to push the bail handle 10 onto an engaging surface 41 of the applicator mandrel 40. To facilitate this movement, the outer diameter of the engaging surface 41 is either equal to or less than the outer diameter of engaging surface 31. In some embodiments, engaging surface 41 defines an outer surface of wall 40b. In some embodiments, the diameter of engaging surface 41 is equal to or smaller than the diameter of engaging surface 31. In some embodiments, collar 50 surrounds wall 30a and is configured to move vertically upward and downward relative to mandrel 30 to push bail handle 10 off of mandrel 30.

Figure 4:
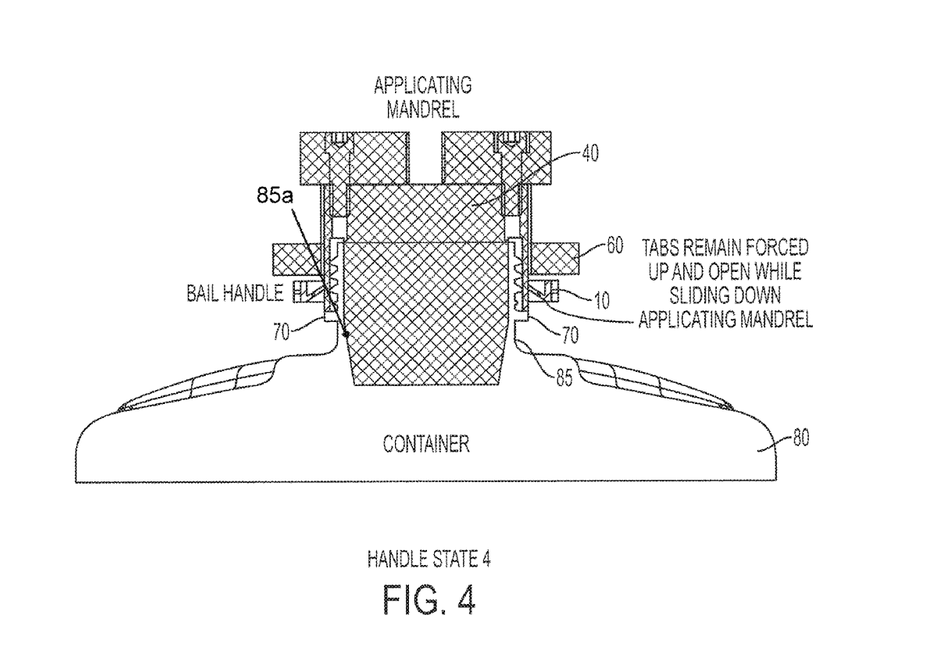
FIGS. 4 and 5 show the process of transferring the bail handle from the applicator mandrel to a container.
Figure 5:
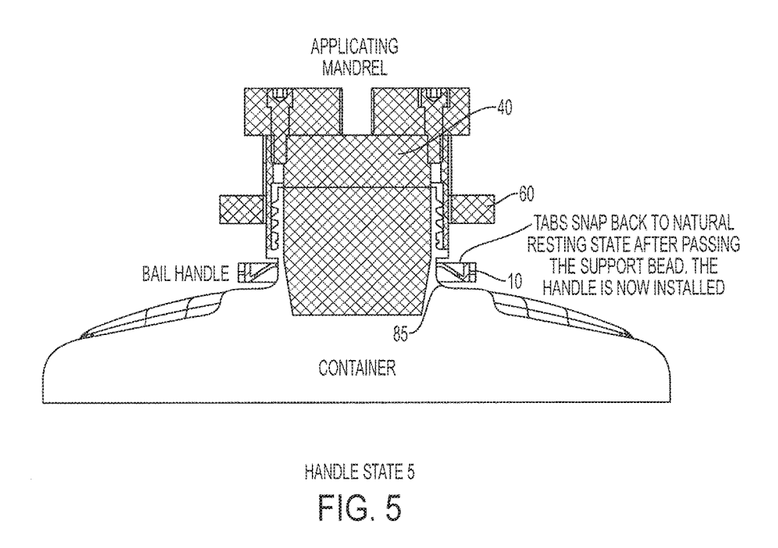
Figure 9:
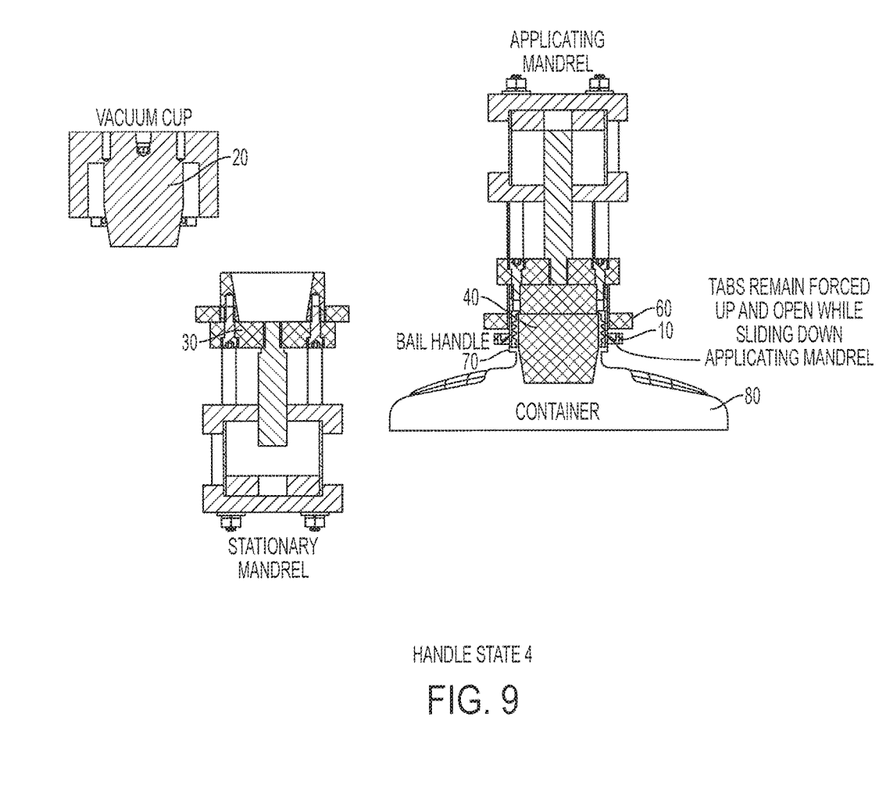
Figure 10:
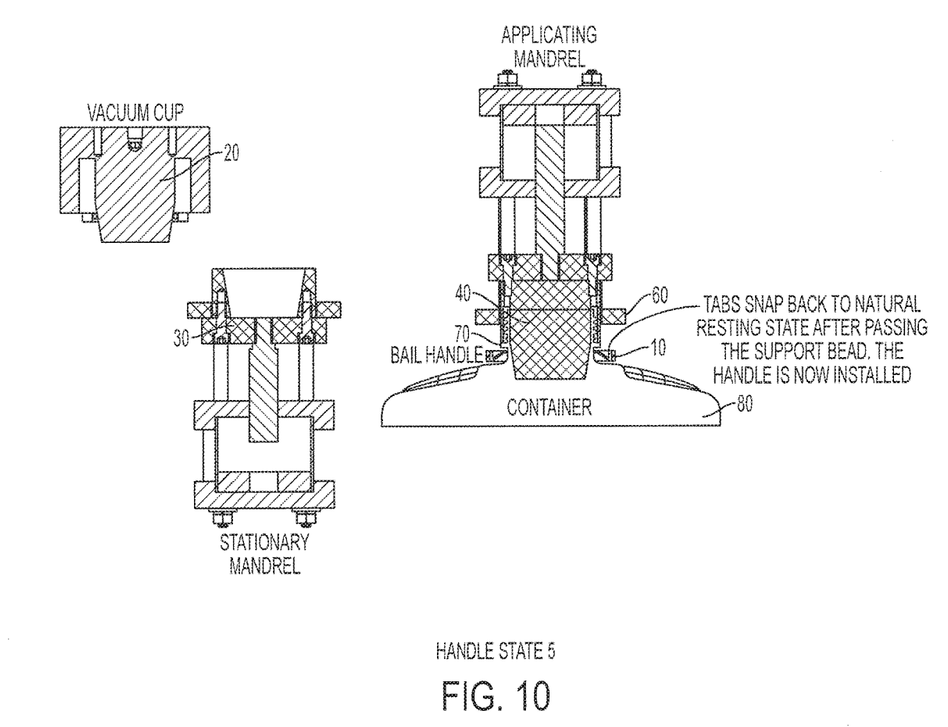
Figure 11:
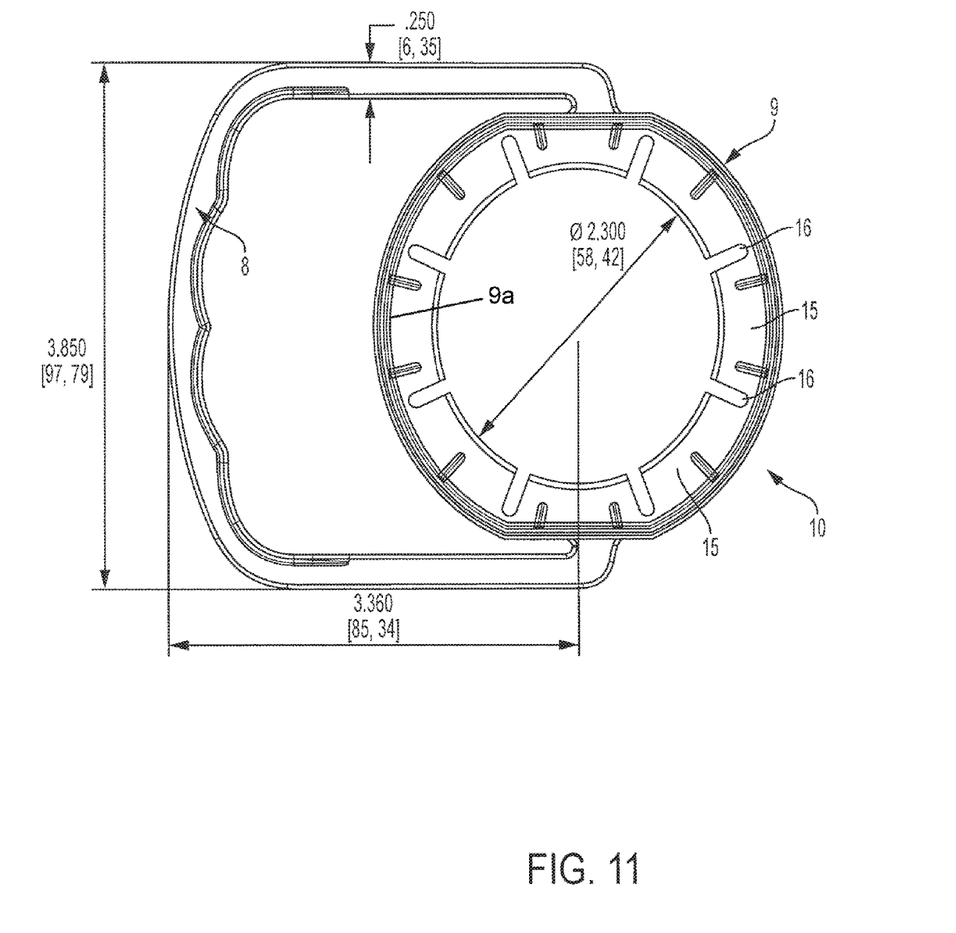
FIG. 11 shows a bail handle.

After the bail handle 10 is moved to engage with engaging surface 41 of the applicator mandrel 40, the applicator mandrel mount 140 moves the applicator mandrel 40 vertically upward from the stationary mandrel 30 and then horizontally to be positioned above the container 80. The applicator mandrel 30 is lowered to engage the neck 85 as shown in FIGS. 4 and 9. Next, the upper pressing collar 60 is lowered for the container 82 push the color 10 across the support bead 70 to engage a portion of the neck 85 just below to support bead 70 as shown in FIGS. 5 and 10. It is noted that the outer diameter of the engaging surface 41 of the applicator mandrel 40 is the same as or slightly larger than the outer diameter of the support bead 70. After passing the support bead 70, the inclined tabs 15 of the bail handle 10 returned to their original positions thus decreasing the inner diameter of the bail handle 10 mount portion 9. Is noted that the incline tabs 15 are still inclined upward when moving in the radially inward direction. In some embodiments, collar 60 surrounds wall 40b and is configured to move vertically upward and downward relative to mandrel 40 to push bail handle 10 off of mandrel 40.

By applying the bail handle 10 in this manner, there is no or substantially no load applied to the container 80. According to this method apparatus, a bail handle 10 can be applied to a container 80 that does not have enough support structure to sustain a large downward force.

Is also noted that the lower surface of the vacuum cup mandrel 20 and a lower surface of the applicator mandrel 40 have a frustoconical shape. The stationary manner has an inner surface that is tapered to align with the frustonconical surfaces of both the vacuum cup mandrel 20 and the applicator mandrel 40. This meeting between frustonconical shape and the tapered surfaces aids in aligning the vacuum cup mandrel 20 and the applicator mandrel 40 with the stationary mandrel 30.

The foregoing is illustrative of example embodiments and is not to be construed as limiting thereof. Although a few example embodiments have been described, those skilled in the art will readily appreciate that many modifications are possible in the exemplary embodiments without materially departing from the novel teachings and advantages of the embodiments. Accordingly, all such modifications are intended to be included within the scope of the embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An applicator for applying a bail handle to a container, the applicator comprising:
    a pickup mandrel for picking up the bail handle to be applied to the container, the pickup mandrel comprising a first projection and a first wall surrounding the first projection, an inner surface of the first wall and an outer surface of the first projection defining a first cavity;
    a stationary mandrel for moving the bail handle from the pickup mandrel, the stationary mandrel comprising a second wall configured for disposal in the first cavity, an inner surface of the second wall defining a second cavity configured for disposal of the first projection, an outer surface of the second wall defining an engaging surface which has a diameter larger than an inner diameter of the bail handle when picked up by the pickup mandrel; and
    an applicator mandrel for moving the bail handle from the stationary mandrel, the applicator mandrel comprising a second projection and a third wall surrounding the second projection, an outer surface of the third wall defining an engaging surface which has a diameter equal to or smaller than the diameter of the engaging surface of the stationary mandrel.

2. The applicator for applying a bail handle to a container according to claim 1, further comprising:
    a lower pressing collar surrounding the second wall and configured to move vertically upward and downward relative to the stationary mandrel to push the bail handle off of the stationary mandrel; and
    an upper pressing collar surrounding the third wall and configured to move vertically upward and downward relative to the applicator mandrel to push the bail handle off of the applicator mandrel.

3. The applicator for applying a bail handle to a container according to claim 1, wherein the pickup mandrel further comprises openings for applying a vacuum in the first cavity, an end surface of the first wall defining a pushing surface for supporting the bail handle.

4. The applicator for applying a bail handle to a container according to claim 1, wherein:
    the projections each have a frustoconical shape, and
    the inner surface of the second wall is tapered to mate with the frustonconial shapes of the projections.

5. The applicator for applying a bail handle to a container according to claim 1, wherein the bail handle comprises a circular mount portion and a handle portion extending from the mount portion, a radially inward side of the mount portion comprising a plurality of inclined tabs separated by gaps.

6. The applicator for applying a bail handle to a container according to claim 1, wherein an outer surface of the second projection and an inner surface of the third wall define a third cavity configured for disposal of a neck of the container.

7. The applicator for applying a bail handle to a container according to claim 1, wherein the container includes a neck having an inner surface defining an opening, the second projection being configured for disposal in the opening.

8. The applicator for applying a bail handle to a container according to claim 1, wherein the first projection and the first wall each include opposite first and second end surfaces, the first end surface of the first projection being flush with the first end surface of the first wall, the second end surface of the first projection extending beyond the second end surface of the first wall.

9. The applicator for applying a bail handle to a container according to claim 1, wherein the outer surface of the second wall extends parallel to a longitudinal axis defined by the stationary mandrel, the inner surface of the second wall extending transverse to the longitudinal axis.

10. The applicator for applying a bail handle to a container according to claim 1, wherein the second projection and the third wall each include opposite first and second end surfaces, the first end surface of the second projection being flush with the first end surface of the third wall, the second end surface of the second projection extending beyond the second end surface of the third wall.

11. The applicator for applying a bail handle to a container according to claim 1, wherein a transverse wall of the stationary mandrel comprises a central opening extending through a thickness of the transverse wall.

12. A method for applying a bail handle to a neck of a container, the method comprising:
 picking up the bail handle using a pickup mandrel, the pickup mandrel comprising a first projection and a first wall surrounding the first projection, an inner surface of the first wall and an outer surface of the first projection defining a first cavity;
 positioning the pickup mandrel over a stationary mandrel and pushing the bail handle over an engaging surface of the stationary mandrel, the stationary mandrel comprising a second wall configured for disposal in the first cavity, an inner surface of the second wall defining a second cavity configured for disposal of the first projection, an outer surface of the second wall defining the engaging surface;
 moving the pickup mandrel away from the stationary mandrel;
 positioning an applicator mandrel over the stationary mandrel to engage the stationary mandrel and pushing the bail handle from the engaging surface of the stationary mandrel to an engaging surface of the applicator mandrel, the applicator mandrel comprising a second projection and a third wall surrounding the second projection, an outer surface of the third wall defining the engaging surface of the applicator mandrel; and
 positioning the applicator mandrel over the container and pushing the bail handle over a support bead formed on the neck.

13. The method for applying the bail handle according to claim 12, wherein the bail handle is pushed over the engaging surface of the applicator mandrel using a collar movably disposed on the stationary mandrel, and the bail handle is pushed over the support bead of the container using a collar movably disposed on the applicator mandrel.

14. The method for applying the bail handle according to claim 12, further comprising:
 applying a vacuum through openings in the pickup mandrel to pick up the bail handle; and
 pushing the bail handle using a pushing surface of the pickup mandrel to push the bail handle over the engaging surface of the stationary mandrel.

15. The method for applying the bail handle according to claim 12, wherein:
 each of the projections have a frustoconical shape, and
 the inner surface of the second wall is tapered to mate with the frustonconial shapes of the projections.

16. The method for applying the bail handle according to claim 12, wherein the bail handle comprises a circular mount portion and a handle portion extending from the mount portion, a radially inward side of the mount portion comprising a plurality of inclined tabs separated by gaps.

17. An applicator for applying a bail handle to a container, the applicator comprising:
 a pickup mandrel for picking up the bail handle, the pickup mandrel comprising a first projection and a first wall encircling the first projection, an inner surface of the first wall and an outer surface of the first projection defining a first cavity;
 a stationary mandrel comprising a second wall configured for disposal in the first cavity, an inner surface of the second wall defining a second cavity configured for disposal of the first projection, an outer surface of the second wall defining an engaging surface, the pickup mandrel being movable relative to the stationary mandrel such that an end surface of the second wall pushes the bail handle onto the engaging surface;
 an applicator mandrel comprising a second projection and a third wall surrounding the second projection, an outer surface of the third wall defining an engaging surface; and
 a lower pressing collar surrounding the second wall and configured to move vertically upward and downward relative to the stationary mandrel to push the bail handle off of the stationary mandrel and onto the engaging surface of the applicator mandrel.

18. The applicator for applying a bail handle to a container according to claim 17, further comprising an upper pressing collar surrounding the third wall and configured to move vertically upward and downward relative to the applicator mandrel to push the bail handle off of the applicator mandrel and onto a neck of the container.

19. The applicator for applying a bail handle to a container according to claim 17, wherein an outer surface of the second projection and an inner surface of the third wall define a third cavity configured for disposal of a neck of the container.

20. The applicator for applying a bail handle to a container according to claim 17, wherein the container includes a neck having an inner surface defining an opening, the second projection being configured for disposal in the opening.

* * * * *